(12) United States Patent
Agtuca

(10) Patent No.: US 9,447,690 B2
(45) Date of Patent: Sep. 20, 2016

(54) WIND GENERATOR HUB ASSEMBLY WITH HYBRID SAIL BLADES

(71) Applicant: 3 Phase Energy Systems, Inc., Auburn, WA (US)

(72) Inventor: Pete Agtuca, Auburn, WA (US)

( * ) Notice: Subject to any disclaimer, the term of this patent is extended or adjusted under 35 U.S.C. 154(b) by 595 days.

(21) Appl. No.: 13/824,243

(22) PCT Filed: Sep. 17, 2012

(86) PCT No.: PCT/US2012/055827
§ 371 (c)(1),
(2) Date: Mar. 15, 2013

(87) PCT Pub. No.: WO2013/040600
PCT Pub. Date: Mar. 21, 2013

(65) Prior Publication Data
US 2013/0183160 A1    Jul. 18, 2013

Related U.S. Application Data

(60) Provisional application No. 61/535,255, filed on Sep. 15, 2011.

(51) Int. Cl.
*F03D 1/06* (2006.01)
*F01D 5/14* (2006.01)

(52) U.S. Cl.
CPC ............. *F01D 5/147* (2013.01); *F03D 1/0675* (2013.01); *F05B 2240/311* (2013.01); *F05B 2280/4003* (2013.01); *Y02E 10/721* (2013.01)

(58) Field of Classification Search
CPC ........... B63H 1/26; B64C 27/46; B64C 9/00; F03B 7/00; F03D 1/00; F03D 1/0633; F03D 1/0675
See application file for complete search history.

(56) References Cited

U.S. PATENT DOCUMENTS

| | | | | |
|---|---|---|---|---|
| 3,810,712 A | * | 5/1974 | Hillman | F03D 3/068 415/907 |
| 4,547,125 A | * | 10/1985 | McMahon, II | F03D 3/068 416/117 |
| 4,739,954 A | | 4/1988 | Hamilton | |
| 5,118,255 A | * | 6/1992 | Moreno | F03B 17/065 416/117 |
| 5,570,997 A | * | 11/1996 | Pratt | F03D 3/067 416/117 |
| 6,682,302 B2 | * | 1/2004 | Noble | F03D 3/068 415/4.2 |
| 6,752,595 B2 | * | 6/2004 | Murakami | F03D 1/0675 416/155 |
| 8,133,023 B2 | * | 3/2012 | Reitz | F03D 1/025 415/1 |
| 8,282,350 B2 | * | 10/2012 | Corrado | F03D 3/067 290/44 |
| 8,430,637 B2 | | 4/2013 | Brown | |

(Continued)

*Primary Examiner* — Jesse Bogue
*Assistant Examiner* — Shafiq Mian
(74) *Attorney, Agent, or Firm* — Dean A. Craine

(57) ABSTRACT

A wind generator hub assembly with lightweight, high efficiency, hybrid airfoil/sail blades. The hub includes three to eight blade mounting surfaces each with a radially extending blade attached thereto. The blades are identical and wedge-shaped and evenly distributed radially around the hub. Gaps are created between each blade. Each blade has an airfoil profile with a curved outer skin layer. Each blade has a large curved leading edge and a flat trailing edge similar to an airfoil. The outer skin layer is secured along its leading edge and removeably attached along its trailing edge to a lightweight internal frame. Each blade includes a transversely aligned end cap with optional louvers. The blades are oriented so their outer skin layers face downwind and rotate towards their leading edges. When wind flows against the inside surface of the skin layers, the blades act as sails to produce thrust.

19 Claims, 14 Drawing Sheets

(56) References Cited

U.S. PATENT DOCUMENTS

| | | | |
|---|---|---|---|
| 8,550,777 B2 * | 10/2013 | Kildegaard | F03D 1/065 416/62 |
| 8,602,355 B2 * | 12/2013 | McBroom | B64C 3/28 244/123.1 |
| 2003/0123973 A1 | 7/2003 | Murakami | |
| 2003/0223868 A1 | 12/2003 | Dawson | |
| 2004/0265127 A1 * | 12/2004 | Noble | F03D 3/068 416/1 |
| 2005/0008488 A1 * | 1/2005 | Brueckner | F03D 1/02 416/132 B |
| 2011/0020123 A1 | 1/2011 | Anderson | |
| 2011/0142670 A1 * | 6/2011 | Pilpel | F03D 3/062 416/230 |
| 2011/0194938 A1 | 8/2011 | Livingston | |
| 2012/0003090 A1 * | 1/2012 | Smith | F03D 7/06 416/91 |

* cited by examiner

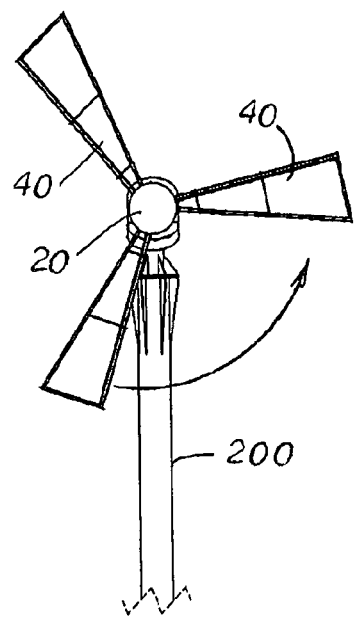
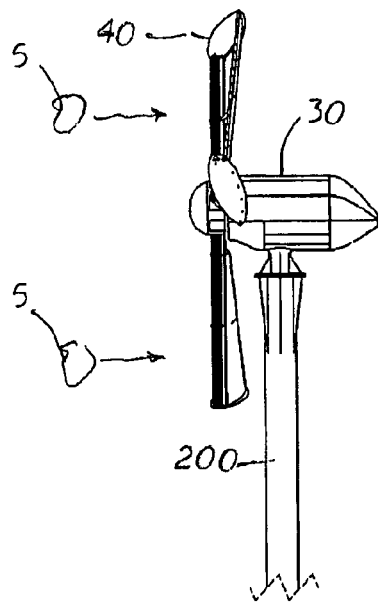
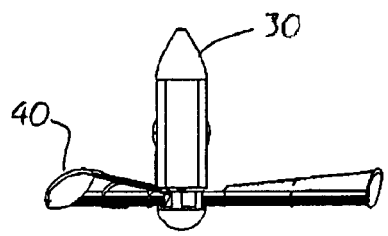
FIG. 4
FIG. 5
FIG. 6

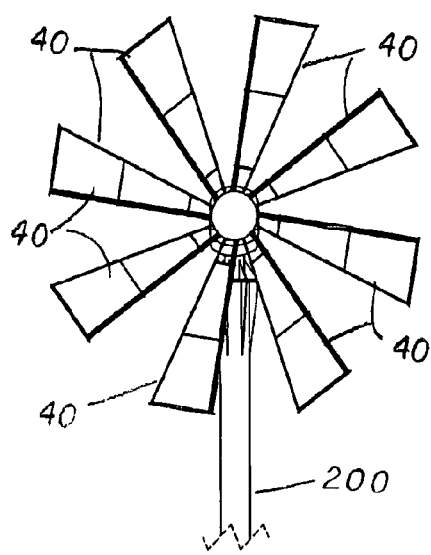
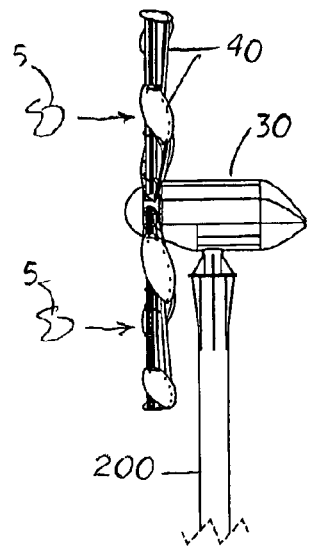
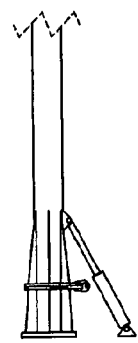
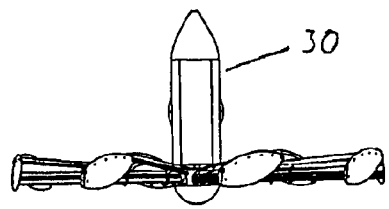
FIG. 7  FIG. 8
FIG. 9

WIND GENERATOR HUB ASSEMBLY WITH HYBRID SAIL BLADES

TECHNICAL FIELD

The present invention relates to wind generators, and more specifically to scalable wind generators used in low to high velocity winds.

BACKGROUND ART

Wind power is widely accepted as an environmental friendly means for producing electric power. Unfortunately, wind generators available today use large and expensive turbine generators mounted at a fixed position on the end of a large vertically aligned pole or tower.

Wind power must compete with and be cost efficient relative to hydro-electric generator systems, coal electric power generator systems, solar and nuclear power electrical power systems. Unfortunately today, the costs of rotors, blades, the generators, the nacelles, the electronics, the towers, and the footings and the installation costs are very high. In addition, the generation of noise, vibrations, visibility of the tower, the impact on birds, and the debris field if a catastrophic event occurs, are also important factors that impede wind power usage.

It is well known, that hills, valleys, trees and buildings affect the velocity of the wind, the wind's direction and turbulence. Most wind power systems are setup and operated in open rural regions with little or no obstructions and few nearby neighbors. The systems include large nacelles with large hub assemblies. The hub assemblies are specifically designed for use with two to three long solid blades. The nacelles and hub assemblies are mounted on the end of a tower that holds the hub assemblies a sufficient elevation above the ground to allow the hub assemblies to rotate freely in the wind.

Large wind power systems found in the prior art typically use high RPM, low torque synchronous generators the produce electricity when the sustainable winds are within a narrow range of velocities. Because such generators require high input shaft velocities, gear boxes are often used between the hubs and the generators. When the velocity of the wind is below the wind range, the hub assemblies or gear boxes are disconnected from the generators. When the wind velocity is above the range, the blades are furled to allow the wind to reduce lift and prevent excessive rotation. In high velocity winds, a dynamic brake may be applied to the hub, gear box or generator to reduce or stop rotation.

High torque, low RPM asynchronous generators produce electricity at lower RPMs. The electricity produced by asynchronous generators is determined by generator shaft's RPMs and the amount of torque applied to the shaft. The shaft's RPMs and the torque are determined by the number of blades and the surface area of each blade. Unfortunately, the solid blades commonly used with wind generator systems are suitable for use with asynchronous generators because of their relatively long lengths and relatively high moments of inertia.

The swept area is the area of a circle the blades of a wind generator create when rotating. The greater the swept area, the greater energy can be captured from the wind and the more electrical energy can be produced.

The power produced by the rotor on a wind generator system, is the product of shaft RPM speed and torque. To transfer equal power, a rotating shaft can operate either at high speeds and low torque, or at low speeds and high torque. As the blades on a rotor increase in size, their RPM speed decrease and the torque increases. Conversely, as the blades on a rotor decrease in size, their RPM speed increase and the torque decreases.

Most wind power systems use synchronous, high RPM, low torque generators to produce A.C. or D.C. electric current. A gear box is normally coupled to the rotor to generate a sufficiently high RPM's needed to rotate the generator. The speed of the generator remains relatively constant as the wind fluctuates. Unfortunately, gear boxes are heavy components that substantially increase the purchase price, maintenance costs and installation costs.

Less common and less expensive wind power system use asynchronous, low RPM, high torque generators to produce A.C. or D.C. electric current. The generators are normally directly connected to the rotors. Because the wind speed can vary, the speed of the asynchronous generator and its output vary with the wind speed. Asynchronous generators are induction generators that require a specific amount of torque applied by the wind to the blades on the rotor. The greater the wind speed, the greater the rotor's RPM's and greater the torque applied to the rotor.

What is needed is a wind generator with an universal hub that uses different qualities and sizes of lightweight blades that can be used in low to moderate winds and in turbulent and non-turbulent winds. What is also needed is such wind generator and universal hub that can be used with either a synchronous or asynchronous generator. What is needed is a wind generator the use blades designed to rotate in low or moderate winds, and respond quickly to changes in the wind speed. What is needed is a blade that automatically releases its engagement or capture of the wind when the wind exceeds a predetermined speed. What is needed is a wind generator system that uses blades that are lightweight and cause little or minimal damage when released. What is needed is a wind generators that can be used with shorter towers and with slowly rotating rotors thereby reducing environmental damage or concerns.

DISCLOSURE OF THE INVENTION

A high solidity hub assembly with lightweight, high efficiency, hybrid airfoil/sail blades. The hub includes at three to eight, blade mounting surfaces each with a radially extending blade. The blades are identical and wedge shaped and evenly distributed radially around the hub. Gaps are created between each blade. Each blade has an airfoil profile with a curved outer skin layer with a large curved leading edge and a flat trailing edge, similar to an airfoil. The outer skin layer is secured along its leading edge and removeably attached along its trailing edge to a lightweight internal frame. Each blade includes a transversely aligned end plate with optional louvers. The blades are oriented so their outer skin layers face downwind and rotate towards their leading edges. When wind flows against the inside surface of the skin layers, the blades act as a sail to produce thrust.

The hub is mounted on a drive axle that connects to either a direct drive or indirect drive generator system. The generator system is mounted inside a nacelle that mounted on the upper end of a tower. In one embodiment, the nacelle can freely rotated on the end of the tower. In an alternative embodiment, the nacelle is coupled to a motor that enables the operator to control its direction. Directional and wind speed sensors are provided that constantly measure the direction and velocity of the wind.

As stated above, each blade is triangular and wedge shaped with a fixed in length and width. The outer section of each blade has a surface area greater than the inner section. Each blade has an airfoil profile and oriented so the large curved surface is tilted towards the direction of rotation and with its angle of attack slightly offset from the blade's rotation path.

Each blade acts as an airfoil that travels in a circle around the hub and as a sail to capture the energy of wind that flows perpendicularly to the blade's transverse axis. During use, wind flows against the inside surface of the blade's outer skin. Because the lead edge of the skin is fixed to the inner frame and curves inward, and because the outside edge of the skin is covered by an endplate perpendicularly aligned with the blade's longitudinal axis, the wind capture by the blade escapes along the blade's trailing edge.

When the blades are exposed to high winds, the trailing edges of the blades are designed to automatically release preventing damage to the rotor. In the preferred embodiment, the end plate includes one or more louvers closed at lower wind speeds. The louvers are coupled to motors and wind speed sensors that automatically open the louvers to allow wind to partially or completely flow over the end of the blade to prevent automatically release of the trailing edges.

The outer skin layer is made of thin, durable polyethylene or polyvinyl chloride film. The outer skin can be clear, painted or include advertising indicia displayed on one surface.

BRIEF DESCRIPTION OF THE DRAWINGS

FIG. 4 is a front view of another horizontal axis wind generator system that uses three hybrid airfoil-sail blades.

FIG. 5 is a side elevational view of the generator system shown in FIG. 4.

FIG. 6 is a top plan view of the generator system shown in FIGS. 4 and 5.

FIG. 7 is a front view of another horizontal axis wind generator system that uses eight hybrid airfoil-sail blades.

FIG. 8 is a side elevational view of the generator shown in FIG. 7.

FIG. 9 is a top plan view of the generator shown in FIGS. 7 and 8. FIG. 6 is an exploded perspective view of the wind generator.

BEST MODE FOR CARRYING OUT THE INVENTION

Figure 1:
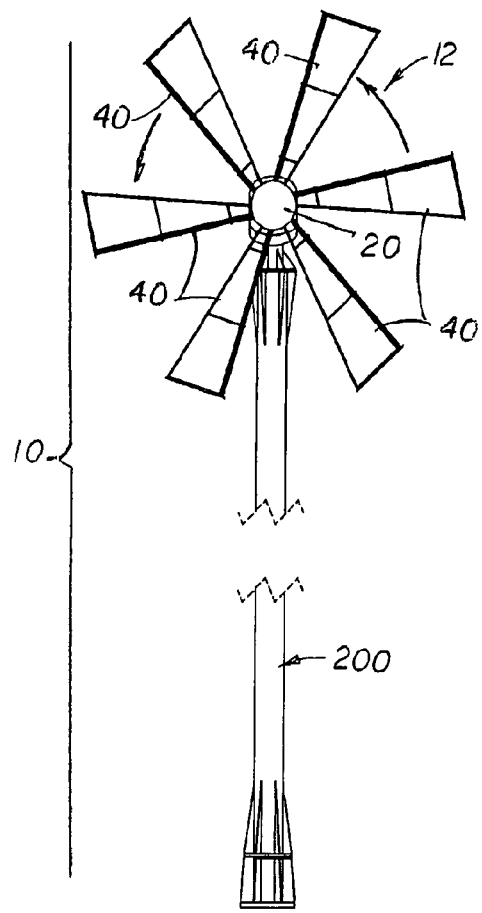
FIG. 1 is a front view of a horizontal axis wind generator system that uses six lightweight, high torque, hybrid airfoil-sail blades attached to a hub assembly.
Figure 2:
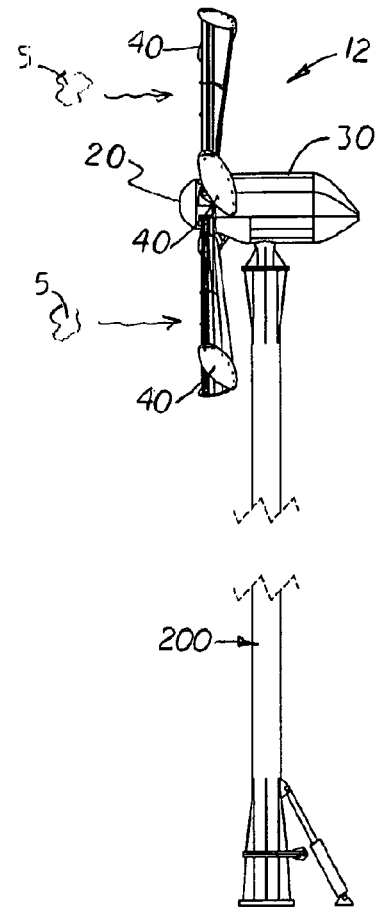
FIG. 2 is a side elevational view of the generator system shown in FIG. 1.
Figure 3:
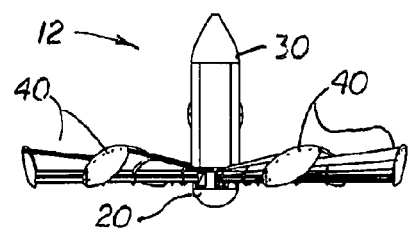
FIG. 3 is a top plan view of the generator system shown in FIGS. 1 and 2.
Figure 10:
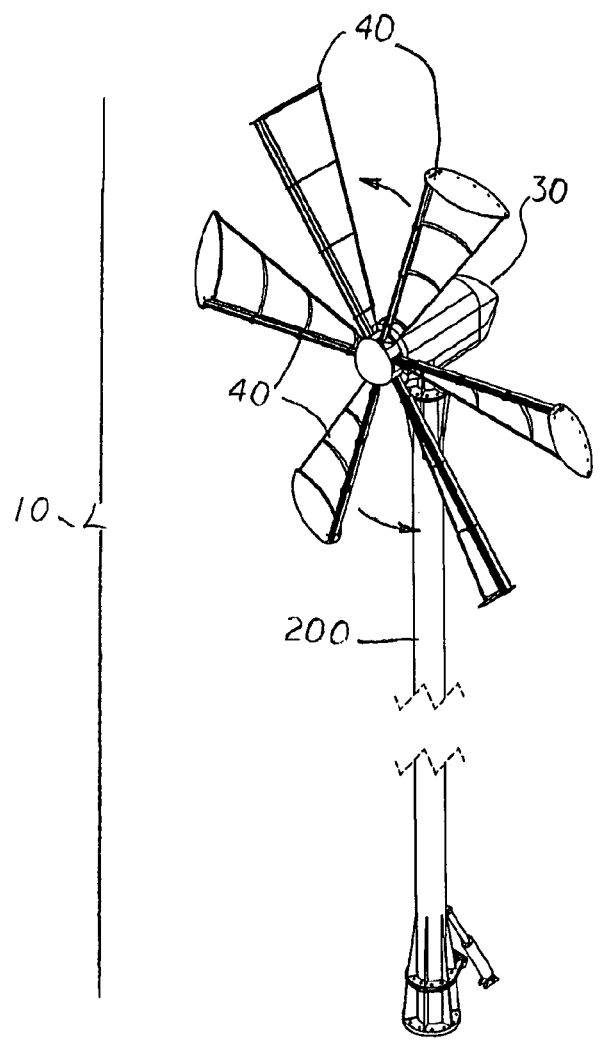
FIG. 10 is a perspective view of the horizontal generator system that uses five hybrid airfoil-sail blades.
Figure 11:
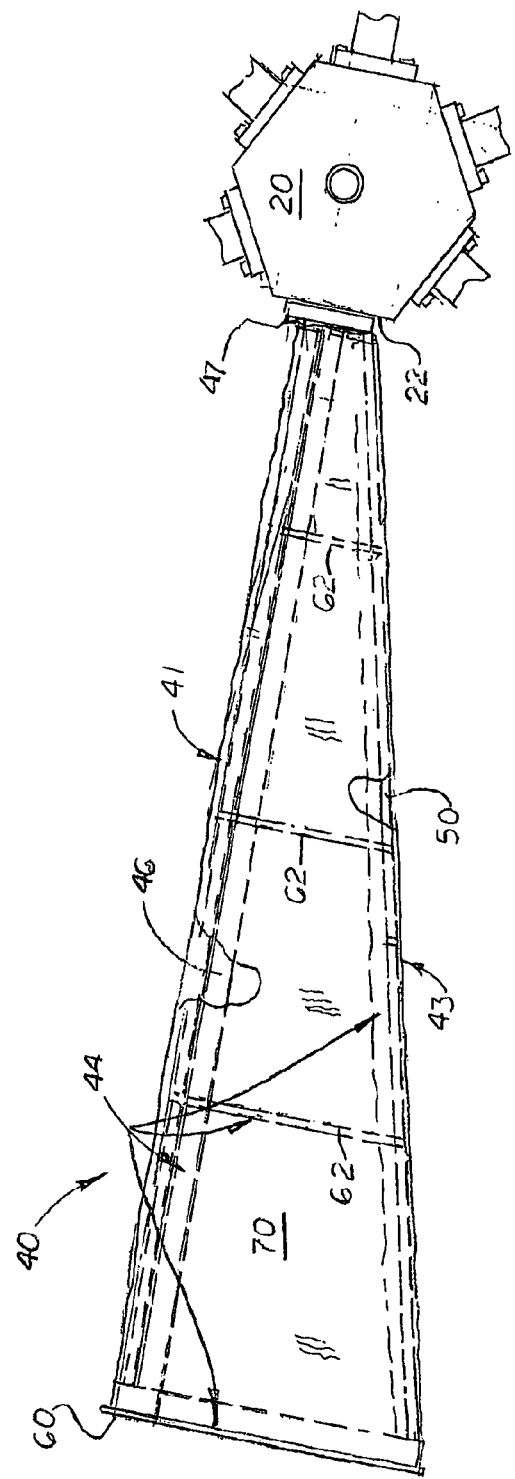
FIG. 11 is a front elevational view of a hybrid airfoil-sale blade attached to a hub showing the inner frame surrounded on its downwind side by an outer skin layer.

Referring to the accompanying FIGS. 1-24, a low wind, lightweight horizontal axis wind generator 10 with a plurality of lightweight hybrid blades 4the function like an airfoil when rotating and as a sail to capture the wind energy.

The blades 40 are attached to a lockable or non-lockable hub assembly 20 that connects to direct or indirect drive wind generator system 100. The generator system 10 is mounted on top of a lightweight tower 200 that is hydraulic lifted from a horizontal position to a vertical position when winds are sufficiently strong. The generator system 1 includes a nacelle 30 with an optional gearbox 34 and a generator 36 located therein. In the embodiment shown in the Figs, the nacelle 30 is coupled to an optional motor 38 that rotates the nacelle 30 and the hub assembly 20 over the end of the tower 200 so that the blades 40 on the hub assembly 20 are perpendicularly aligned with the direction of the wind 5. Directional and wind speed sensors 6 and 7 are provided that constantly measure the direction and velocity of the wind 5.

A key aspect of the invention is the use of plurality of lightweight, relatively high surface area, hybrid airfoil-sail blades 40 each designed to capture the energy from the wind similar to a sail, allows it to escape primarily the trailing edge of the blade and rotate around the hub assembly 20 with little or no resistance similar to an air foil. Each blade 40 includes an outer skin layer 70 maintained in an airfoil profile that 'cups' the wind similar to a sail. By using blades 40 that are lightweight and form a cup, they have relatively high surface areas that the wind 5 presses against. Because each blade 40 has a relatively large surface area, less torque is required for their rotation and the blades to rotate at relatively low wind speeds, (i.e. 2 to 3 mph). By adjusting the length, the width of the blade 40, the surface area of the blade 40 can be adjusted to produce the torque needed for a particular generator. Also, when the wind speed decreases, the rotation of the blades 40 is reduced immediately. In addition, each blade 40 includes a trailing edge 'auto-release' feature, an end plate wind flow control feature, and a simultaneous release that prevents catastrophic damage caused by high gusts.

More specifically, each blade 40 includes a lightweight outer skin layer 70 extended over the blade's lightweight internal frame 44. The internal frame 44 is wedge shaped and includes a large, tubular leading edge support member 46 and a narrow, trailing edge support member 50. Attached to the proximal ends of support members 46, 50 is a hub mounting plate 47. Attached to the distal ends of the support members 46, 50 is a transversely aligned end plate 60. Disposed between the mounting plate 47 and the end plate 60 are one or more transversely aligned wind spars 62. The support members 46 and 50 and the mounting and end plates 47, 60, respectively, are made of aluminum.

The hub assembly 20 is also made aluminum and includes three to eight flat mounting surfaces 22. The mounting surfaces 22 are evenly spaced apart over the outside surface of the hub assembly 20. Attached to the mounting surface 22 is the mounting plate 47 on a blade 40 that securely holds the blade 40 radially outward.

Figure 12:
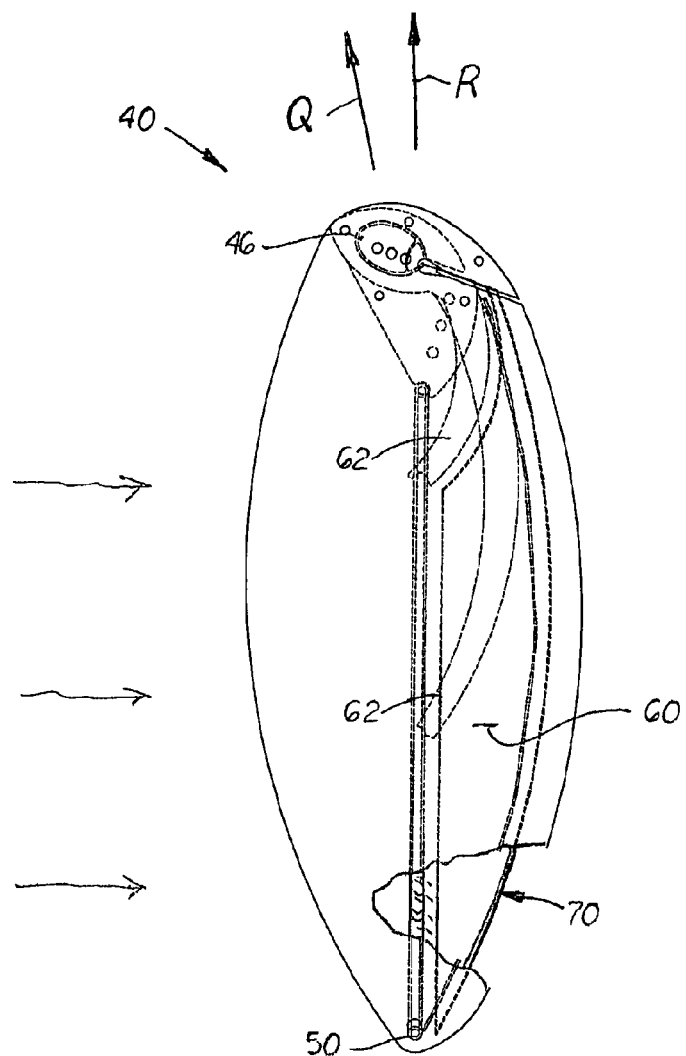
FIG. 12 is a side elevational view of the blade shown in FIG. 11 with a portion of the end cap partially removed.

Attached over the back surface of the internal frame 44 is an outer skin layer 70. When attached to the internal frame 44, the outer skin layer 70 simulates the top surface of an airfoil. Each blade 40 is oriented on the hub assembly 20 so the inside surface of the outer skin layer 70 faces downwind downward and the leading large curve surface of the blade 40 travels along the path of rotation (denoted by the letter 'Q' in FIG. 12. Each blade is also rotated on the hub's mounting surface 2 so its angle of attack, denoted by the letter 'R' in FIG. 12 is slightly offset from the path of rotation 'Q'.

The internal frame 44 holds the outer skin layer 70 in an airfoil/sail configuration at all times. The leading edge of the outer skin layer 7 is affixed to the frame's leading support member 46. The trailing edge of the outer skin layer 70 is removably attached to the frame's trailing support member 50. Each blade 40 as a relatively large surface area used to generate high torque needed to rotate the generator. As shown in FIGS. 1, 4, 7, and 10, a wedge-shaped gap is formed between the blades 40. The number of blades 40, the surface areas of each blade 40, and the surface area of the gaps are determined by the area's wind profile and the type and size of generator used.

During operation, the hub assembly 20 rotates so that cupped or inside surface of each blades faces into the wind. A large portion of the wind is captured by the curved section of the sail, the end cap 60 and wind spars 62 and redirected laterally over the trailing edge of the blade 40. The wind spars 62 also keep the wind 5 from flowing outward to an outer section of the blade 50. As each blade 40 rotates, a small portion of the wind travels over the blade's leading edge. The dual movement of the wind over the blade 40, creates a highly efficient blade system the captures a higher percentage of wind energy.

The end plates 60 are flat planar structures transversely aligned on the outside surface of each blade 40. They are supported by the distal ends of the leading edge support member 46 and the trailing edge support member 50. In the preferred embodiment, the end plates 60 have an airfoil profile that is slightly large but has the same cross-sectional profile as an airfoil. During operation, the end plates 60 prevent wind from moving longitudinally over the end of the blade 40 directing it over the trailing edge.

In high wind events, the trailing edges of the outer skin layer are designed to automatically release thereby preventing damage to the hub assembly 20 and blades 40. When the trailing edges release, the trailing edges of the outer skin layers 70 must be manually reconnected. To control activation of the automatic release feature, it may be desirable to allow wind to escape over the end of the blade 40.

The outer skin layer 70 is made of sail cloth material or durable polyethylene film or poly vinyl chloride film. The outer skin layer 70 may be transparent, painted and may include advertising indicia 79 printed thereon. As stated above, the outer skin layer 70 creates a sail that cups the wind and forces it rearward over the trailing edge. The outer skin layer 70 also creates an airfoil surface that enables the blade 40 to cut through the wind when rotating. In normal operation, the end plate 60 prevents the wind from flowing longitudinally over the end of the blade 40.

The leading edge of the outer skin layer 70 includes a beaded edge 71 that fits inside a slot 49 formed on the leading support member 46. The trailing edge of the outer skin layer 70 is attached to the trailing support member 50 via hook and loop connectors 80, 82. The hook and loop connectors 80, 82 are parallel and disposed longitudinally along the trailing edge of the outer skin layer 70 and loop around the trailer support member 50 during installation.

When a minor or small wind gust occurs, the wind may cause the hook and loop connectors 80, 82 to release. To prevent releasing at lower gusts, the end plate 60 may include one or more louvers 120 that close at lower wind speeds and automatically open at higher wind speeds. The louvers 120 are small doors coupled to a sliding rod 126 are coupled to motors (not shown) and wind speed detectors that automatically open the louvers 120 to allow wind to partially or completely flow over the end of the blade 40 to prevent automatically release of the outer skin layer's trailing edge.

Figure 13:
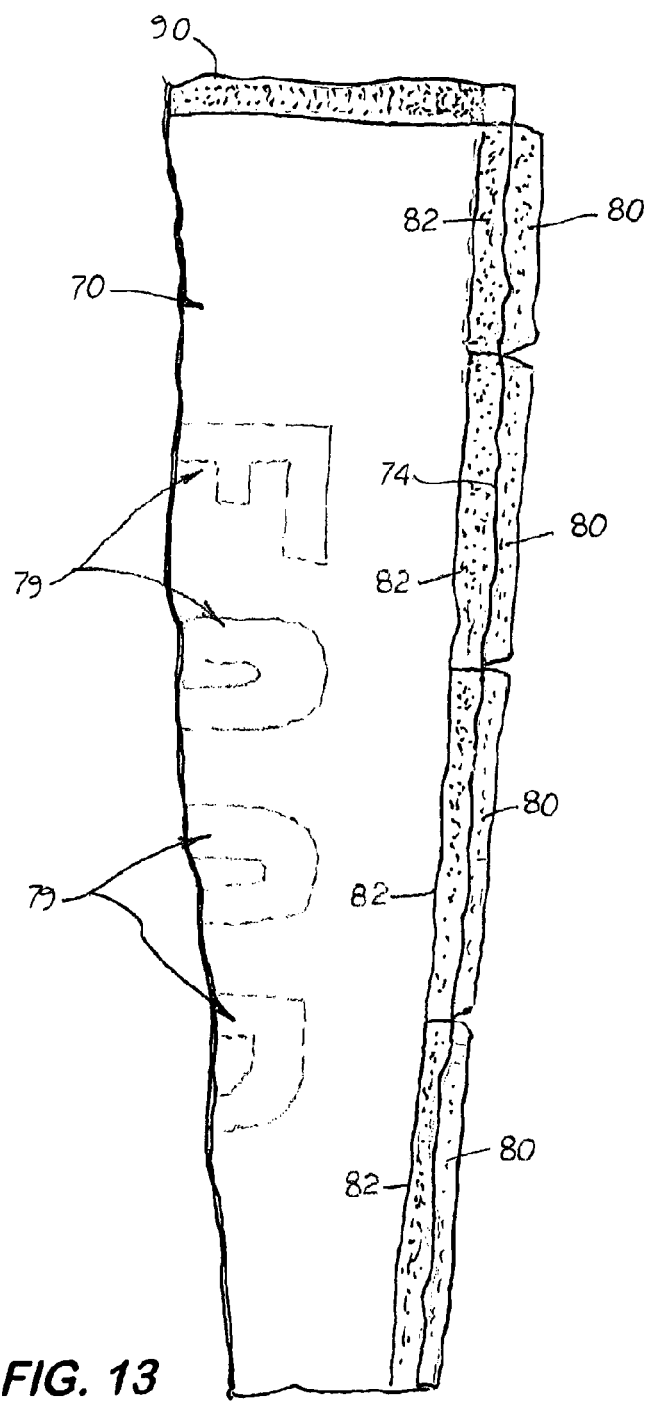
FIG. 13 is a front elevational view of the trailing edge of the outer skin layer showing the hook and loop connecting strips that wrap around the trailing edge support member to removably attach the trailing edge to the inner frame.
Figure 14:
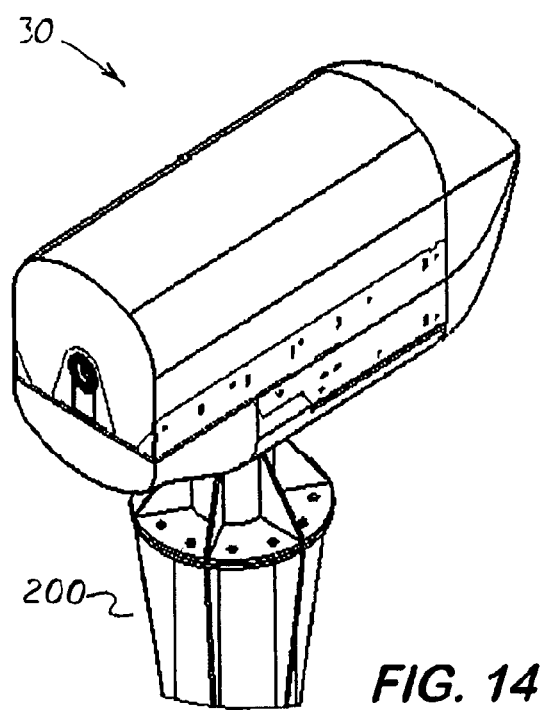
FIG. 14 is a perspective view of the nacelle with the hub assembly and blades removed.
Figure 15:
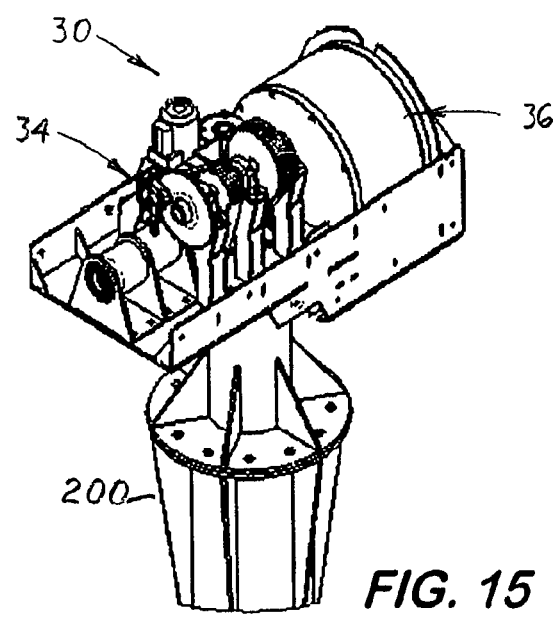
FIG. 15 is a perspective view of the nacelle shown in FIG. 14 with the outer cover removed.
Figure 17:
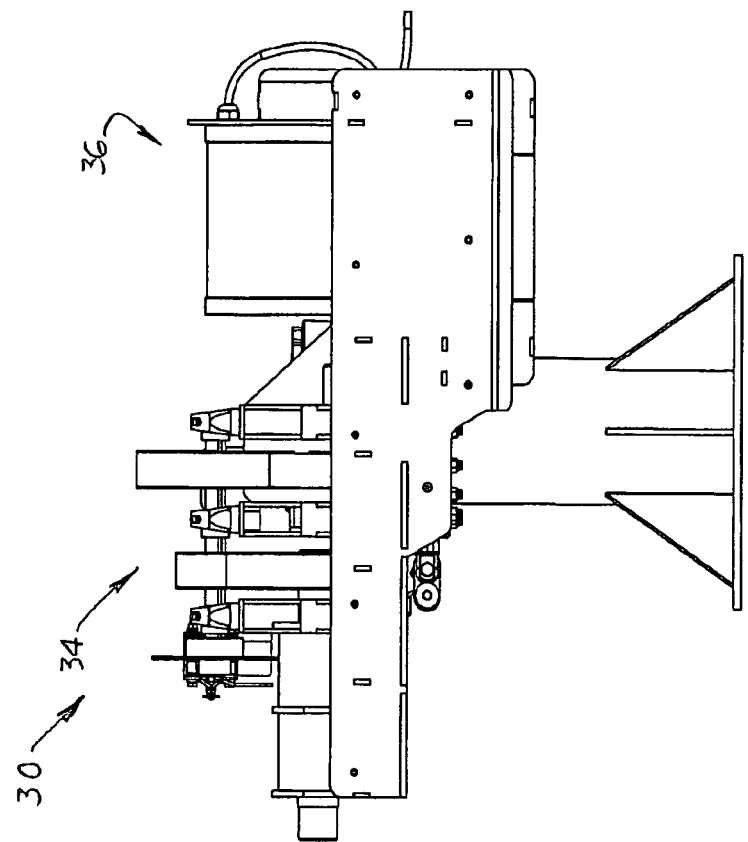
FIG. 17 is a right side elevational view of the wind generator mounted on the nacelle shown in FIG. 16.
Figure 16:
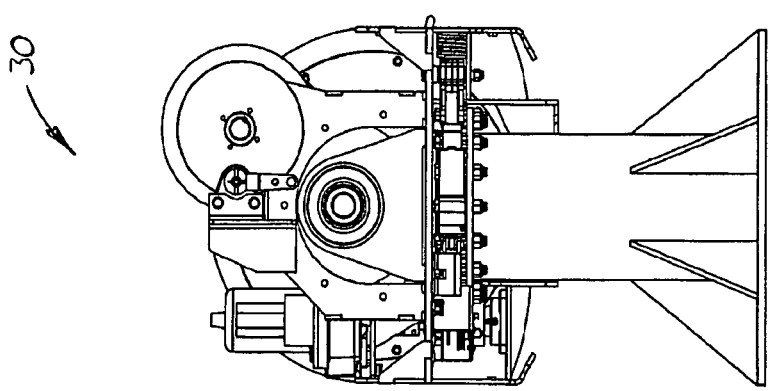
FIG. 16 is a front view of the gear box and the wind generator mounted on the nacelle.
Figure 18:
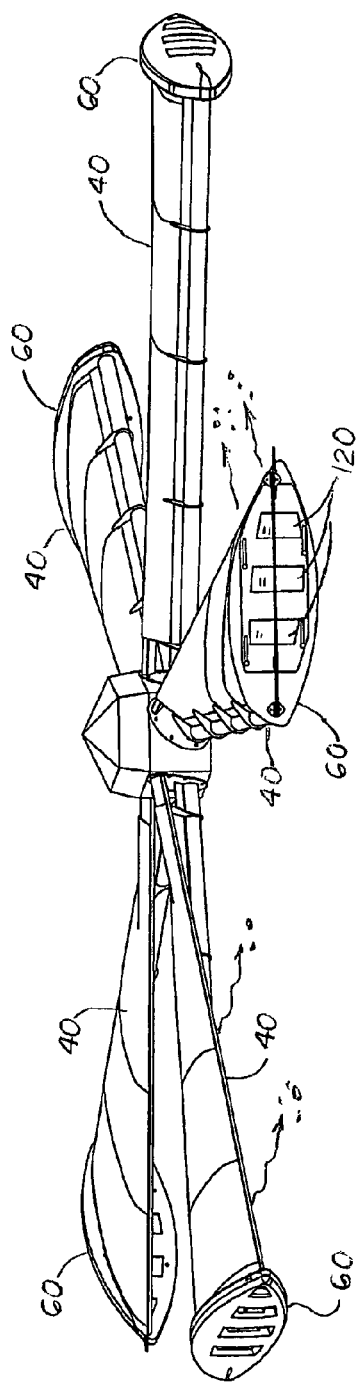
FIG. 18 is a side perspective view of the hub assembly with five hybrid blades each with closed louvers formed on the end plates.
Figure 19:
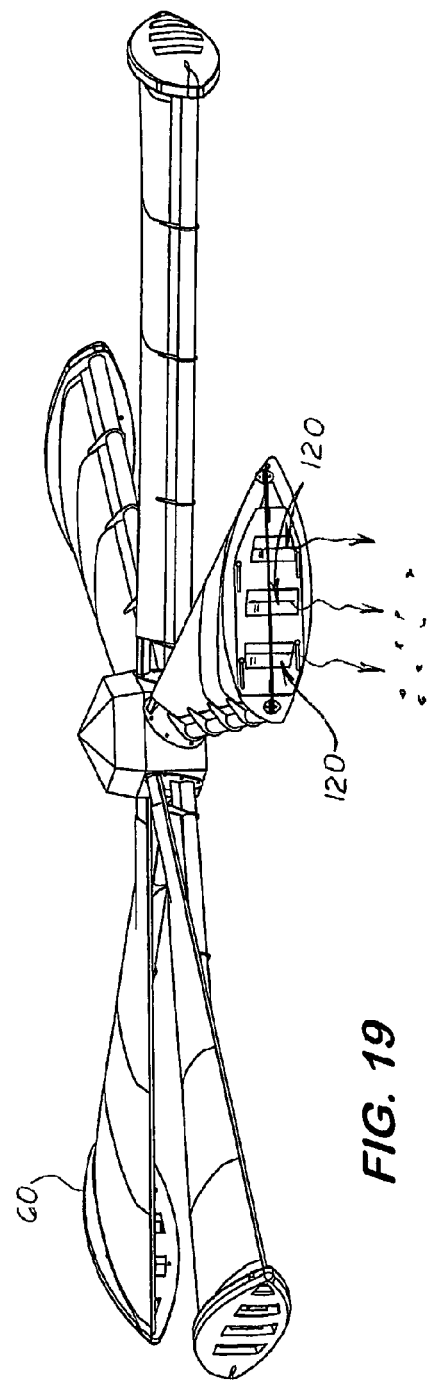
FIG. 19 is a side perspective view of the hub assembly with five hybrid blades each with opened louvers on the end plates that allow wind to pass through the end plate.
Figure 20:
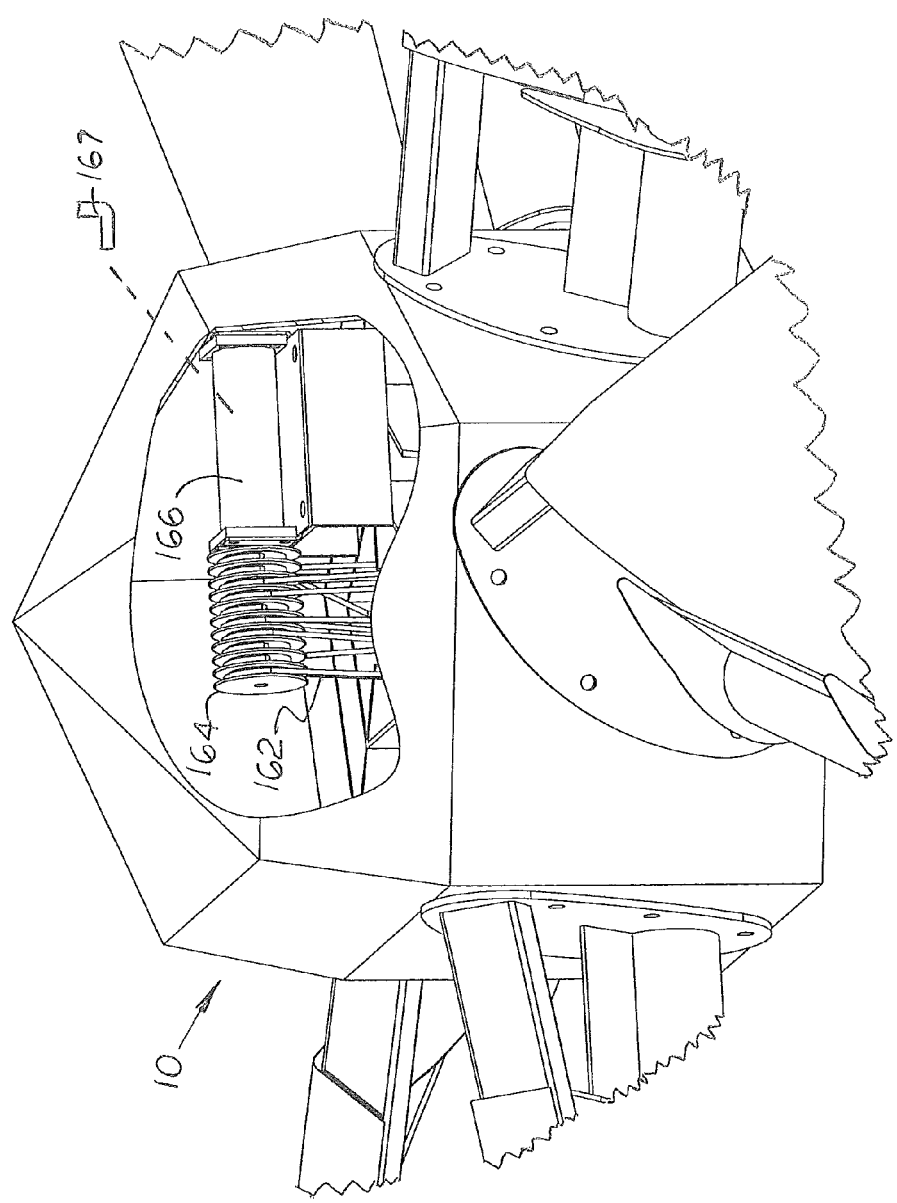
FIG. 20 is a partial perspective view of the hub assembly showing the motor, the pulley assembly and the cables that connect to the louvers on the end plates and a wind sensor coupled to the motor.
Figure 21:
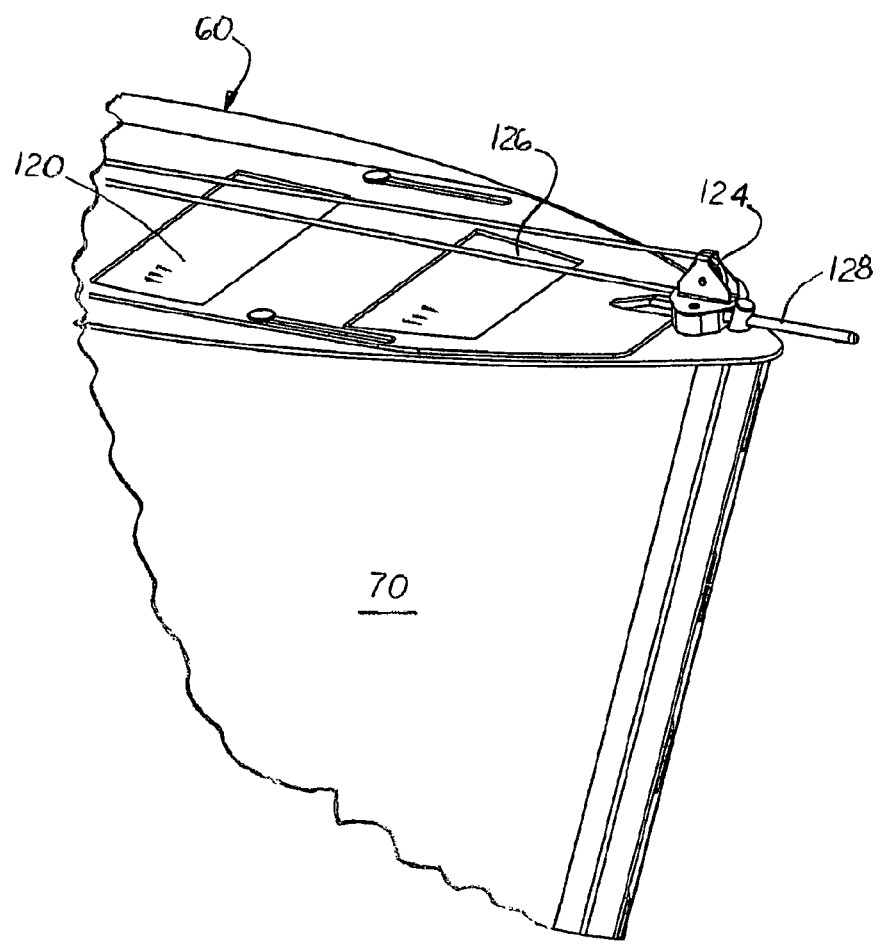
FIG. 21 is a partial perspective view of a hybrid blade showing the end plate with the louvers closed and connected to a connecting rod controlled by pulley and cable.
Figure 22:
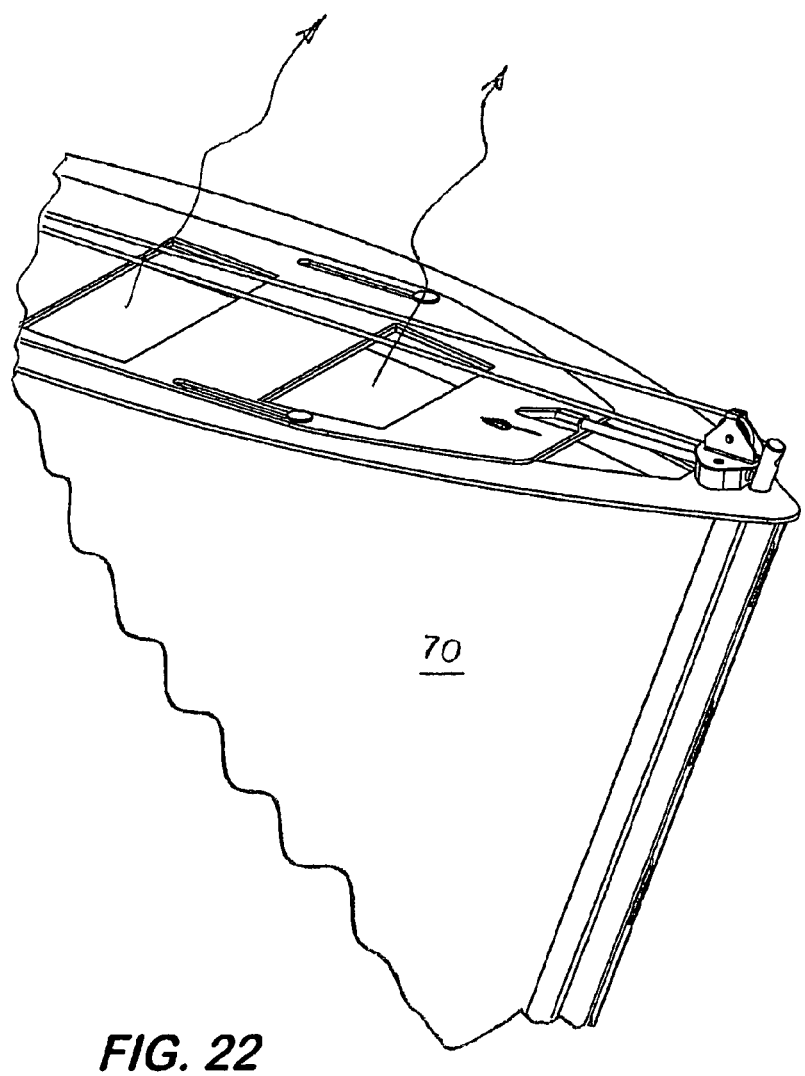
FIG. 22 is a partial perspective view of a hybrid blade showing the end plate with the louvers in an open position to allow wind to escape through the end plate.
Figure 23:
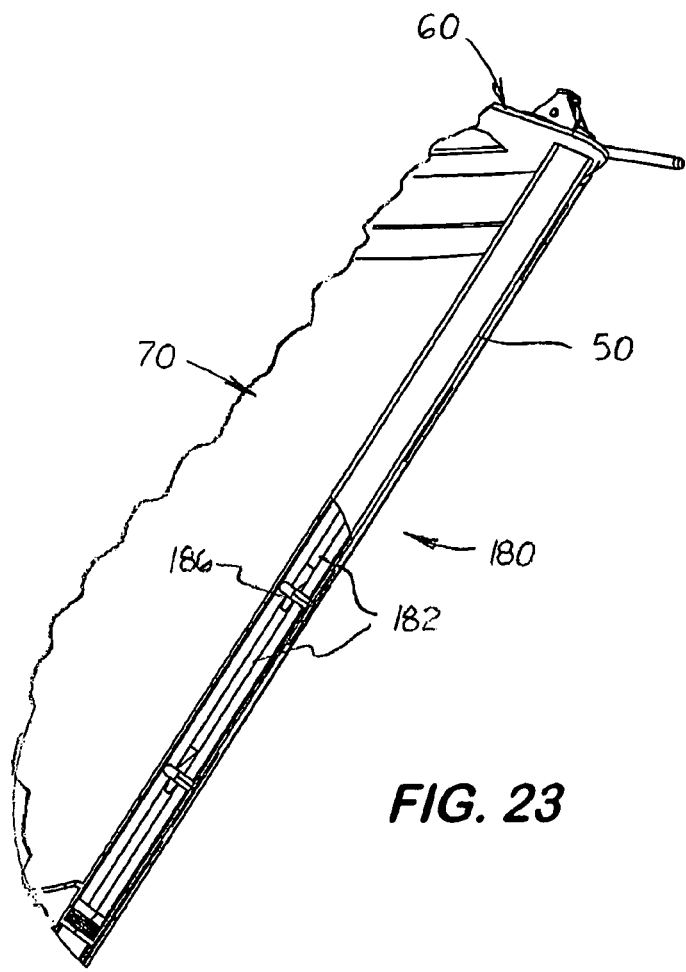
FIG. 23 is a side elevational view of the trailing edge of the outer skin layer and the blades inner frame showing a simultaneous trailing edge release mechanism that allows the trailer edge along the blades outer section to release.
Figure 24:
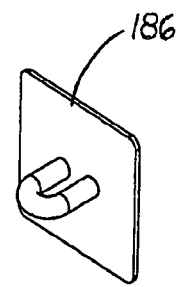
FIG. 24 is a perspective view of a grommet attached to the trailing edge of the outer skin layer.

The cost of wind generators is high. One way to offset the cost is to use the wind generator for a different purpose that will generate additional revenue. It is possible to use the blade when in a fixed position as signage. FIG. 13 shows a blade with advertising indicia 79. When used as an advertising system, the hub assembly 20 must be locked so that the advertising indicia 79 on a blade 40 may be seen and to prevent rotation. The hub assembly 20 and nacelle 30 must also be locked so that the advertising 79 is within view of potential customers. In the preferred embodiment, the wind generator system may include wind sensors coupled to hub locking mechanism automatically activated when the wind speeds are too low and automatically converting the wind generator system into advertizing signage.

The outer sections of each blade 40 have the greatest surface areas and thereby produce higher torque. During high winds, the outer sections of the blades 40 are first to auto-release. As the outer sections are released, the middle and inside sections are then sequentially released until the entire trailing edge of the blade 40 is released. The leading edge of the outer skin layer 70 remains attached to the leading edge support member 46 at all times. To adjust the wind speeds when the trailing edges are released, different hook and loop connectors 80, 82 may be used with different holding properties.

In some high wind events, not all of the hook and loop connectors 80, 82 on the trailing edges of the blades will release automatically. For example, blades 40 located in an elevated position on the hub assembly 20 are exposed to greater winds and will auto-release while blades 40 in the lower locations (or locations not exposed to direct wind) remain connected. Auto release of some blades 40 but not all blades 40, can created imbalance on the hub assembly 20 that can cause damage. To prevent unbalancing, a simultaneous trailing edge release mechanism is provided along the trailing edge adjacent to the outer sections of the blades 40 that when activated, the portion of the trailing edge adjacent to the outer section is disconnect from the internal frame. Because the middle and inside sections typically release sequentially when the outer section of the blade 40 is release, only the outer sections of the blades require the simultaneous release mechanism.

The simultaneous trailing edge release mechanism shown in FIGS. 18-22, includes a spring activated push-pull rod 182 along the trailer edge support member 50. The pull-pull rod 182 extends through grommets 184 attached and space apart along the trailing edge of the outer skin layer 70. The push-pull rod 182 extends through grommets 184 attached the outer skin layer 70 to the trailing support member 50.

Located on the end plate 60 is a pin 160 attached to release cables 162 that move the push pull rod 182 between blocking and releasing positions. When moved to a releasing position, the push-pull rod causes the rod 182 to release the grommets 184 thereby enabling the trailer edge of the outer skin layer 70 to be released. In the preferred embodiment, the cables 162 are connected to pulleys 164 and motors 166 located in the hub assembly 20. The motors 166 are coupled to the wind sensors 167 that monitor the wind for excessive wind speeds.

INDUSTRIAL APPLICABILITY

This invention has application in the electrical wind power industry. More specifically, this invention has application to industries that make blade and hub assemblies used with high torque, low RPM electrical power wind generators.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A horizontal axis wind generator hub assembly, comprising:
    a. a hub assembly that rotates around a horizontal axis with at least three spatially aligned blade mounting surfaces; and,
    b. a lightweight hybrid airfoil/sail blade attached to each said mounting surface, each said blade including an internal frame with a leading edge support member and a trailing edge support member, each said leading edge support member and said trailing edge support member includes a proximal end and a distal end, attached to said proximal ends of said leading edge support member and said trailing edge support member is a hub mounting plate that attaches to said mounting surface on said hub assembly, attached to said distal ends of said leading edge support member and said trailing edge support member is an end plate, attached to said leading edge support member and extending over said trailing edge support member and extending on one side of said blade is an outer skin layer, said outer skin layer has an inside surface and an airfoil profile forming a leading edge and trailing edge on said blade, said blades being oriented on said hub assembly so that when said hub assembly is turned into the wind, the wind flow against said inside surface of outer skin layer and partially directed by said end plate over said trailing edge.

2. The horizontal axis wind generator hub assembly, as recited in claim 1, further including said end plate includes at least one louver that opens allowing wind to travel through said end plate.

3. The horizontal axis wind generator hub assembly, as recited in claim 1, wherein said trailing edge of said outer skin layer is temporarily attached to said trailing edge support member.

4. A The horizontal axis wind generator hub assembly, as recited in claim 1, further including a simultaneous trailing edge release mechanism disposed between the trailing edge of said outer skin and said trailing edge support member that allows said trailing edge of said outer skin to disconnect from said trailing edge support member.

5. The horizontal axis wind generator hub assembly, as recited in claim 1, wherein said outer skin layer is made of polyethylene film or poly vinyl chloride film.

6. The horizontal axis wind generator hub assembly, as recited in claim 1, wherein said outer skin layer includes advertising indicia printed thereon.

7. The horizontal axis wind generator hub assembly, as recited in claim 1, further including each said internal frame includes at least one wind spar extending between said leading edge support member and said trailing edge support member.

8. The horizontal axis wind generator hub assembly, as recite in claim 1, wherein said blade has an airfoil profile and is oriented on said hub mounting plate at an angle of attack to the wind that is offset the path of rotation of said hub assembly.

9. The horizontal axis wind generator hub assembly, as recited in claim 2, further including a wind speed detector coupled to said louver that opens said louver when the wind reaches or exceeds a predetermined speed.

10. The horizontal axis wind generator hub assembly, as recited in claim 3, further including a simultaneous trailing edge release mechanism that when activated causes all of said trailing edges of said outer skin layer to disconnect from said trailing edge support member.

11. The horizontal axis wind generator hub assembly, as recited in claim 1, further including a nacelle attached to said hub assembly which rotates on top end of a tower.

12. The horizontal axis wind generator blade, as recited in claim 7, further including hook and loop connectors that attach said trailing edge of said outer skin layer to said internal frame.

13. A lightweight, horizontal axis wind generator blade, comprising;
    a. a fixed, rigid elongated, internal frame that includes an inside hub mounting plate, a leading edge support member, a trailing edge support member, one or more intermediate strut members, and a distal end opposite said inside hub mounting plate;
    b. an outer skin layer having an inside surface disposed over one half of said internal frame to form a curved cupping surface on one surface of said blade, said outer skin layer being securely attached along one edge to said leading edge support member and being removably attached along a trailing edge opposite of said trailing edge support member that releases said trailing edge from said trailing edge support member skin layer from said trailing edge support when wind flows against said inside surface of said outer skin layer; and
    c. an end plate attached to internal frame configured to block the flow of wind over the distal end of said blade, wherein said endplate is also attached to the distal ends of said leading edge support member and said trailing edge support member, and attached to said leading edge support member and extending over said trailing edge member and extending on one side of said blade is the outer skin layer.

14. The horizontal axis wind generator blade, as recited in claim 13, further including said end plate includes at least one louver that selectively opens to allow wind to travel through said end plate.

15. The horizontal axis wind generator blade, as recited in claim 13, wherein said trailing edge of said outer skin layer is attached to said internal frame with hook and loop connectors.

16. The horizontal axis wind generator blade, as recited in claim 13, wherein said outer skin layer is made of polyethylene film or polyvinyl chloride film.

17. The horizontal axis wind generator blade, as recited in claim 13, wherein said outer skin layer includes advertising indicia printed thereon.

18. The horizontal axis wind generator blade, as recited in claim 13, further including each said internal frame includes at least one wind spar extending between said leading edge support member and said trailing edge support member.

19. The horizontal axis wind generator blade, as recited in claim 14, further including a wind speed detector coupled to said louver that opens said louver when the wind reaches or exceeds a predetermined speed.

* * * * *